US006430527B1

(12) United States Patent
Waters et al.

(10) Patent No.: US 6,430,527 B1
(45) Date of Patent: Aug. 6, 2002

(54) PREFIX SEARCH CIRCUITRY AND METHOD

(75) Inventors: Gregory M. Waters, Groton; Larry R. Dennison, Norwood; Philip P. Carvey, Bedford, all of MA (US); William J. Dally, Stanford, CA (US); William F. Mann, Sudbury, MA (US)

(73) Assignee: Avici Systems, N. Billerica, MA (US)

( * ) Notice: Subject to any disclaimer, the term of this patent is extended or adjusted under 35 U.S.C. 154(b) by 0 days.

(21) Appl. No.: 09/140,030

(22) Filed: Aug. 26, 1998

Related U.S. Application Data

(63) Continuation-in-part of application No. 09/104,314, filed on Jun. 25, 1998.
(60) Provisional application No. 60/084,434, filed on May 6, 1998.

(51) Int. Cl.$^7$ ............................................... G06F 17/30
(52) U.S. Cl. ...................... 703/3; 707/3; 707/6; 707/7; 370/408; 370/389; 370/413; 709/238
(58) Field of Search .................... 370/389, 413, 370/408; 707/3, 6, 7; 709/238

(56) References Cited

U.S. PATENT DOCUMENTS

| | | | | |
|---|---|---|---|---|
| 5,729,228 A | * | 3/1998 | Franaszek et al. ........... 341/106 |
| 5,787,430 A | * | 7/1998 | Doeringer et al. ........... 707/100 |
| 5,909,440 A | * | 6/1999 | Ferguson et al. ............ 370/389 |
| 5,946,679 A | * | 8/1999 | Ahuja et al. ...................... 707/3 |
| 5,983,223 A | * | 11/1999 | Perlman .......................... 707/6 |
| 6,011,795 A | * | 1/2000 | Varghese et al. ............. 370/392 |
| 6,018,524 A | * | 1/2000 | Turner et al. ................ 370/392 |
| 6,052,683 A | * | 4/2000 | Irwin ............................. 707/8 |
| 6,081,522 A | * | 6/2000 | Hendel et al. ............... 370/389 |
| 6,147,996 A | * | 11/2000 | Laor et al. ................... 370/394 |

OTHER PUBLICATIONS

Doreinger et al. "Routing On Longest–Matching Prefixes", IEEE/ACM Transactions on Networking, vol. 4, No. 1, Feb. 1996. Pages 86–97.*

Zitterbart et al, "Efficient routing Table Lookup for IPv6", High–perfomance Communication Systems. Jun. 1997, The fourth IEEE Workshop, pp. 1–9.*

Lampson et al. "IP lookup using multiway and multicolumn search", INFOCOM'98. Seventeenth Annual Joint Conference of the IEEE Computer and Communications Societies. Apr. 1998, pp. 1248–1256.*

"Computer Dictionary", Microsoft Press, Redmond, Washington. 1997 p. 456.*

Perlman, Radia, "Interconnections, Bridges and Routers," Addison Wesley, 1992, pp. 233–239.

Cormen, Leiserson and Rivest, "Introduction to Algorithms," 1990, pp. 381–399.

Lampson, B. et al, "IP Lookups using Multiway and Multicolumn Search," 26 pp., May 1998.

* cited by examiner

*Primary Examiner*—John Breene
*Assistant Examiner*—Khanh Pham
(74) *Attorney, Agent, or Firm*—Hamilton, Brook, Smith & Reynolds, P.C.

(57) ABSTRACT

Prefix searches for directing internet data packets are performed in a prefix search integrated circuit. The integrated circuit includes an array of search engines, each of which accesses a prefix search tree data structure to process a prefix search. An SDRAM is dedicated to each search engine, and SDRAMs share address and control pins to plural search engines on the IC chip. Internal nodes of the tree data structure are duplicated across banks of the SDRALMs to increase bandwidth, and leaf nodes are stored across the SDRAM banks to reduce storage requirements. Within each search engine, data stored in a data register from an SDRAM is compared to a prefix search key stored in a key register. Based on that comparison, an address is calculated to access further tree structure data from the SDRAM. Packet descriptors containing search keys are forwarded to the search engines from an input queue and the search results are forwarded to an output queue, the same packet order being maintained in the two queues.

17 Claims, 13 Drawing Sheets a
ab
ad
b
bae bba
bbc
bbcc
bc
bca bcc
bcca
c
ca
caab caad
caaf
cab
cad
cc ce

FIG. 1

LIST OF PREFIXES

TRIE STRUCTURE

LIST OF PREFIXES

PREFIX SEARCH CIRCUITRY AND METHOD

RELATED APPLICATIONS

This application is a Continuation-in-Part of U.S. Ser. No. 09/104,314, filed Jun. 25, 1998, which claims benefit of Provisional Application No. 60/084,434, filed May 6, 1998, the entire teachings of which arc incorporated herein by reference.

BACKGROUND OF THE INVENTION

A prefix search is used in networking to route and classify packets. The route to be used for a packet and its classification are determined by finding the longest matching prefix in a set. For example a packet using IPv6 (internet protocol version 6) has a 128-bit destination address. A router determines the output port over which such a packet should be routed by searching a set of variable-length binary strings to find the longest string that matches a prefix of the destination address. For classification purposes, other fields of the header, such as the port number, may also be included in the string to be matched.

To illustrate the problem of prefix search, consider the list of prefix character strings shown in FIG. 1 in alphabetical order. The principle is the same with binary strings. Given a search string, such as "cacea", the goal is to find the longest stored string that exactly matches a prefix of this string. Although a simple linear search of the list finds that this string falls between "cab" and "cad", one must scan several strings backward from this point to find that the longest matching prefix is "ca" In actual routing tables, which may contain hundreds of thousands of entries, the matching prefix may be far from the point where the linear search fails. An optimized data structure is needed to efficiently find the matching prefix.

A prior method for performing longest prefix matching employs a data structure called a trie. A trie for the prefix list of FIG. 1 is shown in FIG. 2. As shown, the trie is a tree structure in which each node of the tree resolves one character of the string being matched. Each internal node consists of a list of characters. Associated with each character is an outgoing link either to another internal node, a rectangle in the figure, or to a leaf node, a circle in the figure. A slash at the start of a node indicates that a prefix leading to that node with no additional characters is part of the list. Each leaf node holds the result data associated with the prefix leading to that leaf node, and in the figure, the leaf nodes are labeled with these prefixes. The result data might, for example, be the output port associated with a data packet and a flow-identifier.

To search the trie, one starts at the root node, node 1 in the figure, and traverses the tree by following the outgoing link at each node conesponding, to the next character in the string to be matched. When no matching outgoing link can be found, the longest matching prefix has been found. For example, given the string "cacea" we start at node 51. The "c" directs us to node 54. The "a" directs us to node 58. As we cannot find a match for the next character, "c", at node 58, we follow the link associated with the slash to the leaf node associated with the longest matching prefix, "ca". Note that if prefix "ca" were not in the list, we would need to backtrack at this point to node 54 for prefix "c".

Another prior method for prefix matching is to perform binary search on a table. However, as described by Radial Perlman, Interconnections, Bridges and Routers, Addison Wesley, 1992, pages 233–239, and shown in FIG. 3, since binary search will find the closest matching string, rather than the longest matching prefix, we must make two modifications to the list to apply this technique. First, we insert two entries for every entry in the list that encloses other entries, that is, that would serve as a longest matching prefix for another prefix in the list but for the other prefix itself being in the list. One of those entries is terminated by the symbol 0, which comes alphabetically before all characters, and one by the symbol 1, which comes alphabetically after all characters. These two entries act as parentheses enclosing all entries that contain the prefix. Second, we attach to each entry in the list not ending in a 0 a pointer to the nearest enclosing entry. FIG. 3 shows the list of FIG. 1 augmented in this manner. Note that the prefix "ca" has been replaced by the two entries "ca0" and "ca1" that bracket all entries containing the prefix "ca" and that all of these entries have a pointer back to "ca0".

To search the augmented list of FIG. 3 for the longest matching prefix, one searches for a string equal to a prefix of the target or the alphabetically closest pair of strings. Strings ending in "0" or "1" never exactly match a prefix of the target string because "0" and "1" do not match any character of the target string. If the search finds an exact prefix of the target string, the result data associated with the string is retrieved. Otherwise, the search found the closest pair of stored strings, Sa and Sb. in this case there are three possibilities:

1. If Sa ends in a "0" symbol, then the longest matching prefix is this string with the "0" removed.
2. If Sb ends in a "1" symbol, then the longest matching prefix is this string with the "1" removed.
3. Otherwise, an enclosing pointer from Sa is followed to find a string ending in a "0" symbol which encloses Sa and the nearest match is that string with the "0" symbol removed.

For example, a search for "cacea" will end between "cab" and "cad". Since this is not an exact match, "cab" does not end in "0", and "cad" does not end in "1", the pointer from "cab" is followed back to "ca0" giving the longest matching prefix, "ca". Similarly a search for "cb" will end between "ca1" and "cc" and follow the pointer from "ca1" back to the common prefix, "c".

SUMMARY OF THE INVENTION

While the trie structure and binary search strategy work, they are not well suited for implementation in a hardware search engine. The trie requires a memory access for every character of a string and possible backtracking if a match is not found. This makes it inefficient in terms of memory bandwidth usage. The binary search strategy requires storing two result pointers for the majority of prefixes, one for a direct match and one to the enclosing string or its associated result. This makes it inefficient in terms of memory usage.

The prior application Ser. No. 09/104,314, filed Jun. 25, 1998 discloses and claims a data structure, an augmented tree, that stores prefix sets in a manner that enables efficient searching and a hardware engine for searching the augmented tree. The augmented tree stores the prefix set with enclosing prefixes in a tree structure similar to a B-tree, a tree with a radix greater than one previously used to efficiently search for exact matches by optimizing the tree node size to the size of data blocks retrieved from storage discs. The prefix search data structure comprises a tree structure having internal nodes for identifying subsequent nodes from prefix search keys. Leaf nodes each comprise a set of prefix keys to be compared to a prefix search key. The sets of prefix keys of plural leaf nodes together form a list of prefix keys including enclosing prefix key pairs.

In accordance with the present invention, prefix search circuitry is provided on an integrated circuit. A plurality of prefix search engines are provided oil the integrated circuit, each engine performing a prefix search of a prefix search data structure based on a prefix search key.

Preferably, prefix search keys embedded in input packet descriptors are distributed from an input queue over an internal network to the plural search engines and the results of the prefix searches are forwarded to an output queue. At the output queue, the search results are ordered in the same order that the corresponding input packet descriptors arrived at the input queue. The internal network may include an input bus from the input queue to the search engines and an output bus from the engines to the output queue.

Preferably, the search engines on the integrated circuit are associated with an array of memory units, each unit dedicated to a search engine within the integrated circuit. Each search engine reads data in bursts over integrated circuit data pins dedicated to the search engine, and each search engine addresses a memory unit over integrated circuit pins shared with another search engine. Preferably, each memory unit is a synchronous dynamic random access memory (SDRAM) which comprises plural banks of memory cells, and a prefix search tree data structure is stored across the plural banks to provide access to the tree structure in successive read cycles. Internal nodes of the tree structure arc duplicated across plural banks, and leaf nodes are interleaved across plural banks.

The preferred prefix search engine comprises a data register which receives data of a tree structure from memory, a search key register, a comparator and an address calculator. The comparer compares a search key in the search key register with data from the data register, and the address calculator calculates memory addresses based on the comparator output to read the data from memory into the data register.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a list of prefixes used to illustrate the invention.

FIG. 8 is a timing diagram illustrating access of data from a single SDRAIM bank of FIG. 7.

FIG. 9 illustrates the alternating access of data from two banks of an SDRAM chip.

FIG. 10 is a timing diagram illustrating shows a timing diagram for two search engines axing their respective two blanks of SDPAM memory over a common set of address and control lines.

DETAILED DESCRIPTION OF THE INVENTION

Figure 2:
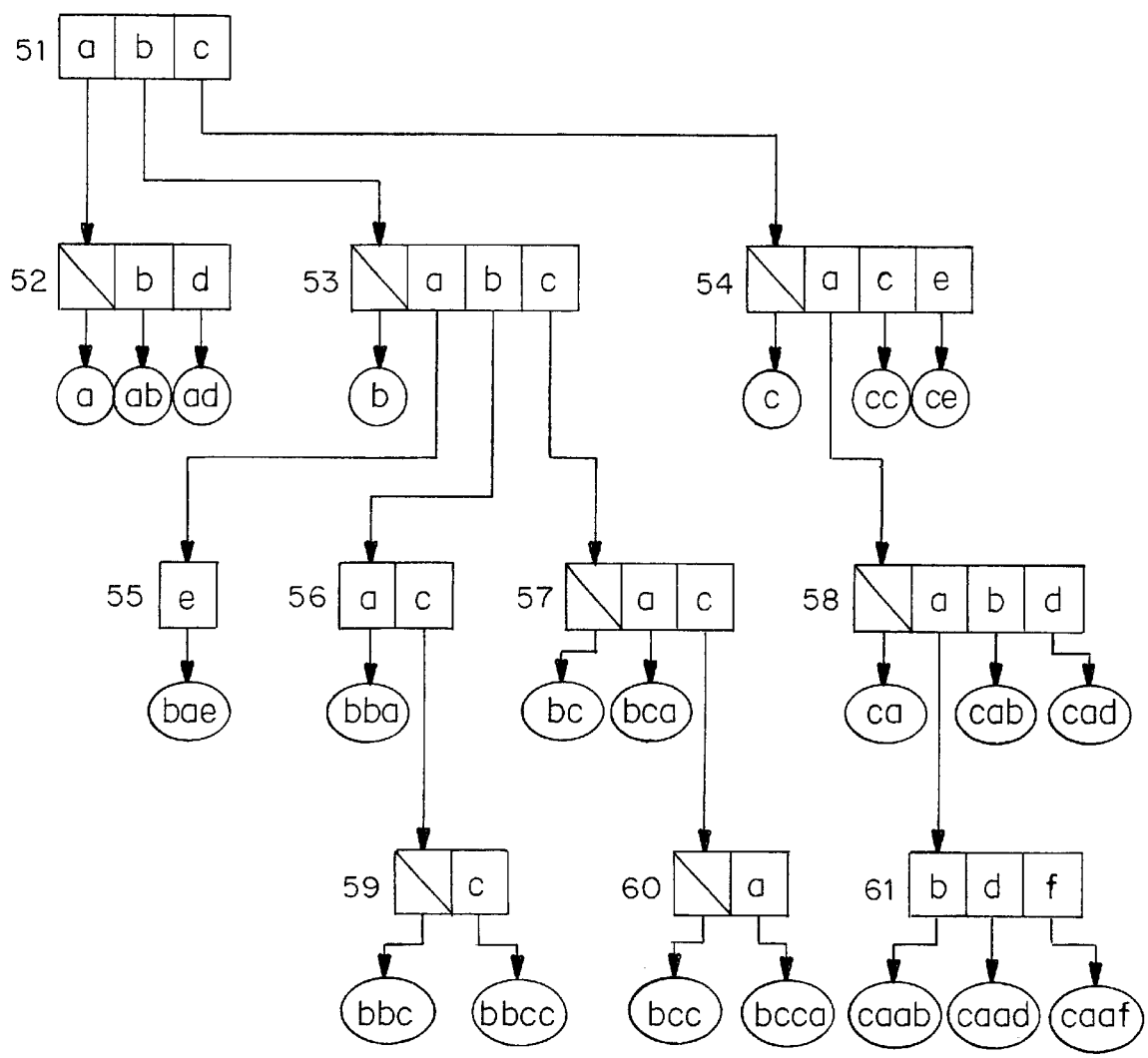
FIG. 2 is a prior art trie used to search prefixes.
Figure 3:
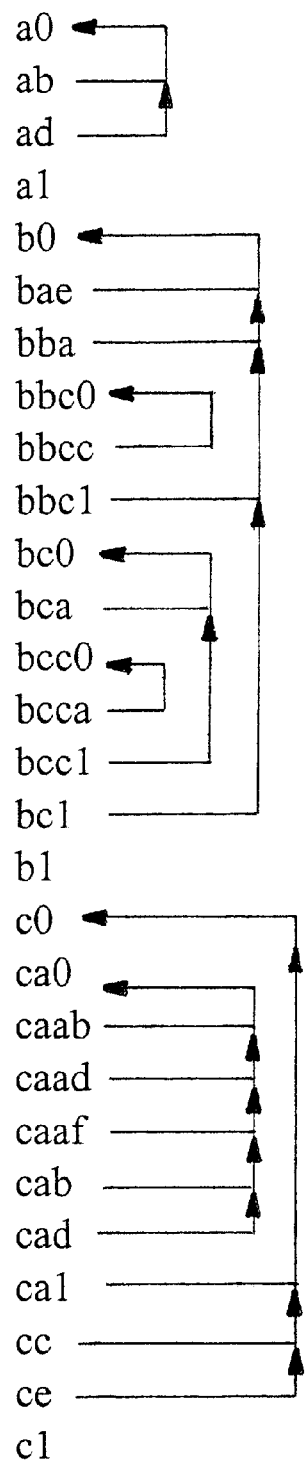
FIG. 3 is the prefix list of FIG. 1 modified to include enclosing prefixes and pointers in accordance with another prior art approach.
Figure 4A:
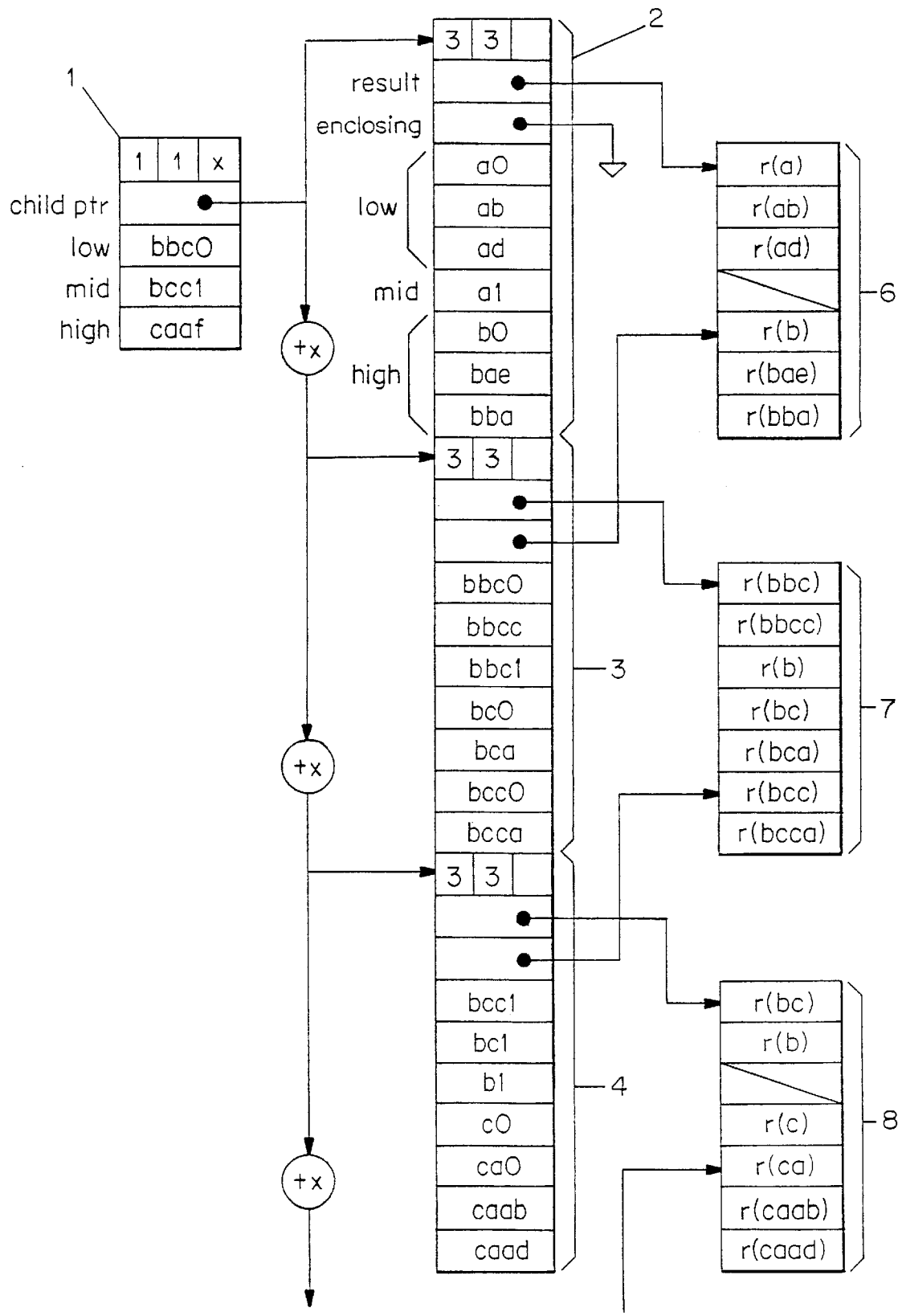
FIGS. 4a and 4b illustrate a tree data structure embodying the present invention.
Figure 4B:
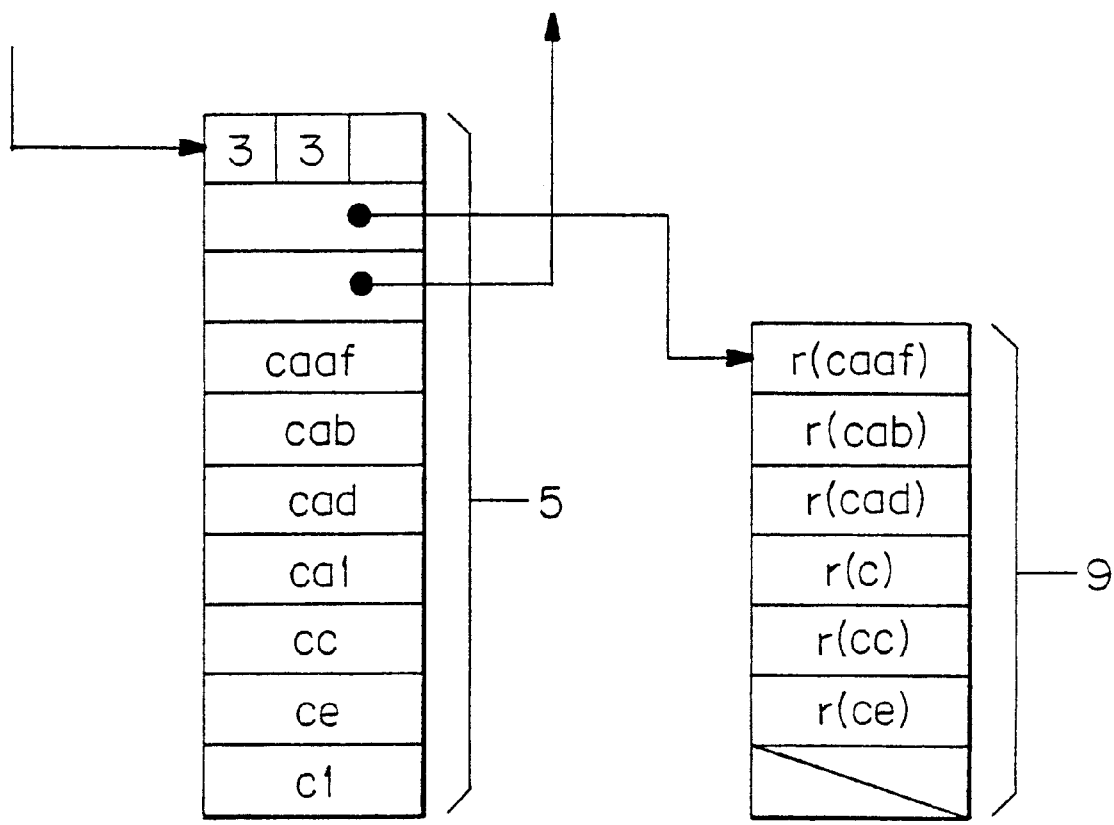

FIGS. 4a and 4b show an augmented tree for the prefix list of FIG. 1 modified to include the same enclosing prefixes as in FIG. 3. This particular augmented tree has a single internal node, node 1, which is also the root node for the tree. It has four leaf nodes, labeled 2–5. Each node holds a set of prefixes, which we shall also call keys in the discussion to follow. Each internal node, such as node 1, holds the set of keys that divide the key space across its children. A suitable set of keys is the alphabetically lowest key in each subtree except the first. Each child node holds a contiguous set of keys from the complete key list. To facilitate access by a hardware engine, as described below, the keys in each node, internal or leaf, are stored in three parts. The middle key is stored first, followed by a set of keys that are all less (in alphabetical order) than the middle key (the low keys). The low keys are in turn followed by the high keys, a set of keys that follow the middle key. While the example shows a total of three keys in the one internal node and five keys in each leaf node, larger nodes are preferable to optimize memory bandwidth. In the preferred embodiment, each node holds 1 to 16 keys including one middle key, zero or more low keys, and zero to seven high keys.

The structure is best understood by means of an example. Consider searching for the search key "cacea" using the augmented tree of FIGS. 4a and 4b. The search begins at the root node (labeled 1). This node contains some parameters, a single child pointer, and a set of dividing keys partitioned into three sets as described above. The parameters encode the size of the node and its children. They include the number of low keys (one in this example), the number of high keys (one), and the size of each child node (x bytes). The child pointer, p, identifies a block of memory that holds contiguous child nodes of uniform size. The pointer directly identifies the first child node. Subsequent child nodes are found by indexing off of this pointer after scaling by the child node size. Simplistically, the ith child node is located at (p+i*x). (Keys in a node are numbered 1 . . . k as are results associated with a leaf node's keys. Children of an internal node are numbered 0 . . . k.).

In the preferred embodiment, the augmented tree is stored in dynamic random access memory (DRAM) which permits rapid access within a memory "row" of 512 bytes. Nodes are up to 64 bytes in size, an internal node has one to 16 children, and the "contiguous" children start on any 64-byte boundary. Therefore the children of one internal node may occupy parts of one to three DRAM rows. In order to read any parts of a node quickly, each node is confined to one DRAM row. To achieve this, the ith child of an internal node is stored at (p+i*x+r) where, for the second and third rows, r accounts for wasted space at the ends of one and two DRAM rows, respectively, containing lower-numbered children of the same internal node The child node to be accessed is determined by comparing the search key to the entries stored in the internal node. The key, in this case "cacea," is first compared to the middle key, "bcc1" in this example, and since it is lexicographically larger than this key, it is then compared against the high keys, "caaf" in the example. As the search key is greater than all of the keys in the internal node, the last child (index i=3) is selected and the search proceeds to this child, labeled 5.

Node 5 is a leaf node. The sets of prefix keys of plural leaf nodes together form a list of prefix keys including enclosing prefix key pairs. A leaf node could return the longest matching prefix from which the output port and flow identifier, for example, could then be determined. Preferably, however, the leaf nodes comprise result pointers which directly point to the desired output port and/or flow identifier associated with the longest matching prefix. Such data could also be stored directly in the leaf nodes, but in view of varying lengths of results and sharing of results, pointers result in more efficient storage of data.

Leaf node 5 contains parameters, a result block pointer, an enclosing result pointer, and a list of keys divided into three sets. The parameters include the number of low keys (3) and the number of high keys (3). At this node, the search key is again compared to the stored keys. As the key "cacea" is less than the middle key of this node, "ca1", it is compared against the low keys and it is found to fall between keys "cab" and "cad". Since no exact match is found, the search must now scan for the longest enclosing prefix. If the keys are stored in alphabetical order, this is accomplished by scanning backwards through the keys in this node, starting at "cab", to look for the nearest start or end key, a string ending in "0" or "1." As no such prefix is found in the node, the enclosing result pointer is followed to find the result record for the enclosing prefix for the block, "ca". Following this pointer directly gives the result associated with key "ca", r(ca).

If the search ends at or just after a key that is a prefix of the search key (that is, the search ends between a matching prefix and the next prefix key), that key is the longest matching prefix, and the result is identified using the result block pointer. If we search the structure of FIGS. 4a and 4b for the search key "cadam", the search would proceed as above except for the final step. Once key "cad" is found as the third key associated with node 5 and determined to be a prefix of "cadam", the result block pointer is followed to result block 9 and the third result (corresponding to the third key) is retrieved giving r(cad).

If, in scanning backwards, the search ends in a start or end key, the result is identified using the result block pointer. A start key, a string ending in a 0, is the enclosing key for the prefix being searched and points to the result for that enclosing key. On the other hand, if the scan backwards identifies an end key, a string ending in a 1, that key will not be an enclosing key for the search key but it does point to the result for that key's enclosing prefix.

Figure 5:
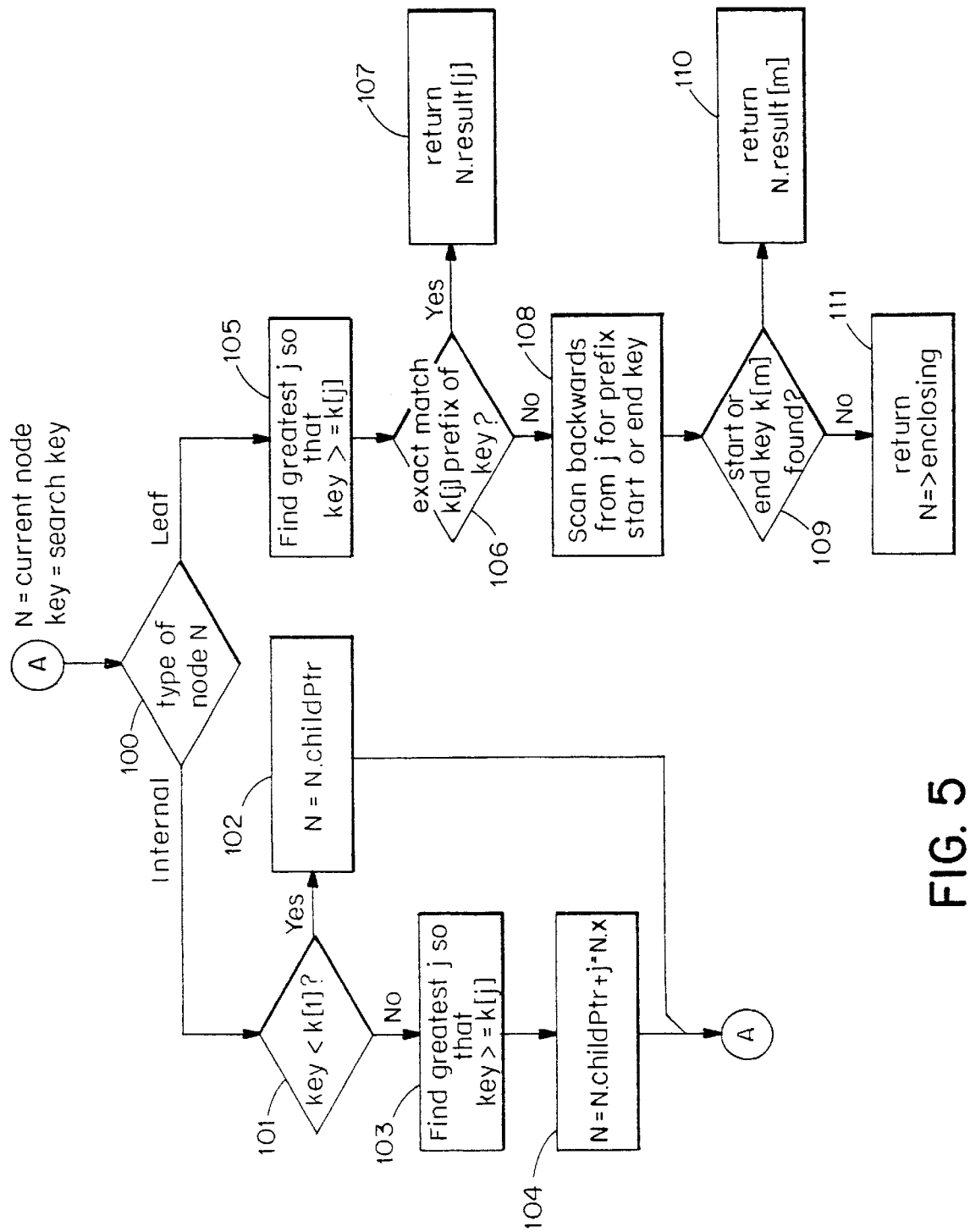
FIG. 5 is a flow chart of the search method using the tree of FIGS. 4a and 4b.

A flow-chart of the augmented tree search method is shown in FIG. 5. The method starts at decision box 100 with variable "N" equal to the root node of the augmented tree and variable "key" equal to the key being searched for. As long as N is an internal node, the search proceeds down the left side of the figure (boxes 101 to 104) to identify the child node to search next by comparing against the partitioning keys stored in node N, k[1] . . . k[n]. Box 101 checks if "key" is less than all of these stored keys. In this case the child pointer is followed directly (box 102) to find the first child and the search continues from point A before box 100. If "key" is greater than k[1], the key list is scanned to find the last key, k[j], less than or equal to "key" (box 103). The index of this key, j, is used to compute the address of the j-th child node in box 104 and the search continues from point A.

After traversing a number of internal nodes, the search eventually arrives at a leaf node (like node 5 in FIG. 4a and 4b) and the search proceeds down the right side of FIG. 5 (boxes 105 to 114). There are three possible ways in which the longest prefix matching the search key can be found corresponding to boxes 107, 110, and 111. First, box 105 scans the stored keys to find the last key, k[j], less than or equal to the search key, "key." Box 106 checks if k[j] is a prefix of key and, if so, the corresponding result is returned in box 107. This path is followed, for example, in the search for "cadam" in the augmented tree of FIGS. 4a and 4b as described above.

If not, the keys k[j] . . . k[1] are scanned for a prefix start key or end key, that is a key ending in the symbol 0 or the symbol 1, respectively. Box 109 checks if such a key, k[m],j>=m>=1, is found. If so, the corresponding result is returned in box 110. This path is followed, for example, if we search the augmented tree of FIGS. 4a and 4b for the search key "baz". The search terminates on leaf node 2 with j =6 and k[j] ="bae". Scanning backward finds the prefix start key k[m] ="b0" with m=5. The fifth entry of the result block (6), r(b), is thus returned. The path to box 110 is also followed if a prefix end key (ending in the symbol 1) is found during the backward scan. For example, suppose we search for key "cd" in the augmented tree of FIGS. 4a and 4b. The search will terminate on leaf node 5 with j=5 and k[j] ="cc". Scanning backward we encounter k[m] ="cal" at m=5. Associated with each prefix end key is the result not for that key but for that key's enclosing prefix. In this case, the result for enclosing prefix "c", r(c), is associated with "cal" and is returned from this search. We know that the longest prefix enclosing "ca" is the same as the longest prefix enclosing the search key because "cal" and the search key are between the same bounding start and end keys or parentheses. If there were a prefix that enclosed "ca" but not the search key, we would have encountered the end key of that prefix in our backward scan.

If k[j] is not a prefix of the search key and we find no prefix start or end keys between k[j] and k[1], then the search proc the node is returned. This path is followed, for example, in the search for "cacea" in the augmented tree of FIGS. 4a and 4b as described above. By building the augmented tree so that the enclosing pointer of each node points to the result for the enclosing prefix of the first key of the node, we bound the number of keys we must scan to find an enclosing prefix to the contents of a single node.

Root Tables and Bit Stripping

With very long keys, e.g. 64-bits, the amount of storage required to hold the augmented tree is significant. An augmented tree with 300,000 prefixes of 64-bit keys, for example may contain up to 19 million bits of storage. The actual number will be smaller as most prefixes do not contain the full 64 bits. The storage requirements for the augmented tree can be reduced by starting the search by indexing a table using the most significant several bits of the search key and then discarding these bits. The table lookup returns a pointer to the root node of an augmented tree holding stored keys beginning with those bits. As all entries in the tree have the same most significant bits, these bits can be omitted from the stored keys resulting in considerable storage savings. For our example 300,000 key tree, a table of 4096 20-bit root node pointers (to be indexed with the most significant 12-bits of the search key) takes about 80,000 bits. Removing the 12 most significant bits from all 300,000 stored keys saves 3.6 million bits.

This approach of stripping a common prefix off of all stored prefixes in a subtree to save space can be applied independently of the use of root tables. Any internal node of an augmented tree that roots a subtree for which all stored prefixes share a common prefix can apply this method.

Similarly, the use of tables is not restricted to the root of a tree. At any point in the tree structure where it would be advantageous to index on a prefix of the search key rather than to compare the search key against partitioning keys, a table node can be inserted in place of an internal tree node.

Figure 6:
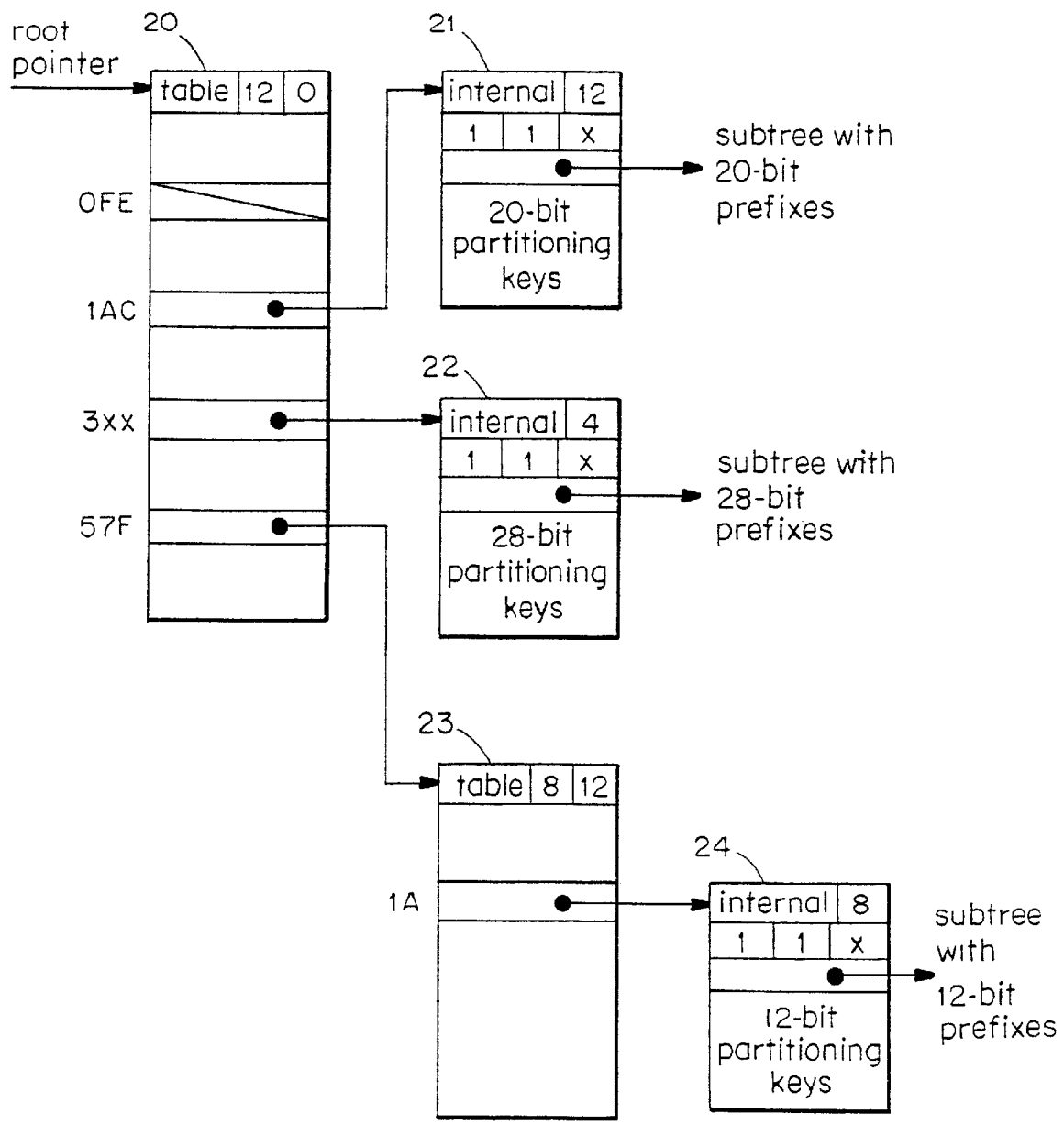
FIG. 6 is an alternative tree having both partitioning nodes and table nodes in accordance with the invention.

FIG. 6 illustrates the use of a root table and the use of prefix stripping both in conjunction with the table and with normal augmented tree internal nodes. The figure shows five tree nodes, labeled 20–24, frowning the upper portion of the tree. The lower portions of the tree and all of the leaf nodes are not shown. Each of the tree nodes is tagged with its type: "table" or "internal". A leaf node would be tagged with type "leaf". A root pointer identifies the root node, which in this case is a table node (20). The search tree in the figure is configured for use with 32-bit search keys.

Table node 20 includes its tag, two parameters, and a table of pointers to subtrees. The two parameters indicate the number of bits from the search key to use in indexing the table (12), and the number of bits from the search key to discard before indexing (0). The remainder of the node contains the table which is of size $2^k$ where k is the first parameter. Thus, the table portion of node 20 contains $2^{12}$=4096 entries. For clarity only four of these entries are shown in the figure.

The first of these entries, at index 0FE (hexadecimal), holds a null pointer, denoted by the slash. It is not unusual for many of the entries in a root table to be empty (no stored prefixes start with the index of that table entry). These empty entries are marked by storing a null pointer. If almost all of the entries in a table are empty, it may be more efficient to replace the table node with a partitioning internal node since partitioning nodes do not consume any space representing null entries.

The second entry shown in the table, at index 1 AC (hexadecimal), points to internal node 21 that roots a subtree where all of the stored prefixes start with the prefix 1AC. Thus each stored prefix can be shortened by discarding these common 12 bits. The internal node format is as described in conjunction with FIGS. 4a and 4b above with two additions. First, the node is tagged with its type, "internal" to distinguish it from "table" nodes and "leaf" nodes. Second, a parameter is added (12) indicating the number of bits to strip from the search key before comparing the key against the partitioning prefixes stored in the node. If our search key is hexadecimal 1AC27EF4, for example, this node directs us to strip the most significant 12-bits (1 AC) before searching this node and its associated subtree with the remaining 20-bit key, 27EF4.

In some cases, a prefix stored in an augmented tree is shorter than the index used to index a table node in the tree. This situation is handled as illustrated by the third entry shown in the table. In this case, the prefix "3" is stored in the augmented tree. To encode this in the table, all indexes starting with 3 (hexadecimal) hold pointers to internal node 22. This causes any search with a key beginning with "3" to proceed to node 22. Node 22 in turn specifies that only 4-bits are to be stripped off the search key. This allows the search proceeding from this point to distinguish keys starting with prefixes "3a" and "3b" for example. While this causes internal node 22 to use more storage, to hold 28-bit keys, the keys can be compressed at the next level of the tree by specifying that additional bits are to be discarded before searching that level. As with null entries, duplicate entries in a table waste space, and in cases where there are many short prefixes, replacing the table node with an internal node may result in a more efficient representation.

The final entry shown in node 20 of FIG. 6 illustrates the case where a table entry points to another table node. In this case, index 57F (hexadecimal) directs the search to table node 23. The parameters in node 23 direct that 12-bits (the prefix 57F) be stripped from the search key, and that the next 8-bits be used to index the table. For example, if the search key is 57F1A1DE, the top 12-bits are first stripped, leaving 1A1DE. The next 8-bits, 1A (hex), are then used to index the table. The resulting pointer directs the search to internal node 24 where these 8-bits are then stripped, leaving the search to continue with the remaining 12-bits, 1DE (hex).

One skilled in the art will understand that the possibilities for arranging augmented trees using table nodes, internal nodes and bit stripping extend beyond the simple example presented here. In general, an augmented tree may be arranged with any combination of table nodes and internal nodes, and one or more bits may be discarded from the search key at each node along a search path. By optimizing the combination of node types and bit stripping, the resulting tree can be made to consume considerably less storage than if all nodes were internal nodes and all prefixes were stored full length.

An augmented tree can be constructed using well known techniques for constructing B-Trees. For example, the method described in Cormen, Leiserson, and Rivest, Introduction to Algorithms, 1990, pp. 381–399 for incrementally constructing a B-Tree by inserting one node at a time into an empty tree may be employed. Alternatively, one can construct an augmented tree directly from a list of prefixes augmented with parentheses, such as the list shown in FIG. 3. This is accomplished by segmenting the list into fixed sized blocks that become the leaf nodes of the tree. A new list is then constructed comprising the first prefix of each node except of the first node. This list is then segmented into fixed size blocks that form a rank of internal nodes in the tree. The process, making a list from the first prefix of a set of nodes and constructing a new set of nodes by segmenting this list, is then repeated until the list fits into a single node. For example, the leaves of the tree of FIGS. 4a and 4b are constructed from the list of FIG. 3 by segmenting the list into blocks of 7 prefixes. Each 7-prefix block becomes one leaf node of the tree. The first prefix of each block except the first block is then extracted and used to construct a new prefix list that fits entirely into the one internal node of FIGS. 4a and 4b.

Hardware Search

In the past, prefix search algorithms for packet header processing have been executed in software running on a conventional processor. At the very high packet rates required for internet backbone routing, however, (about 5M packets/sec), software searching is too slow to keep up. To operate at these speeds, a hardware prefix search engine is required.

Figure 7:
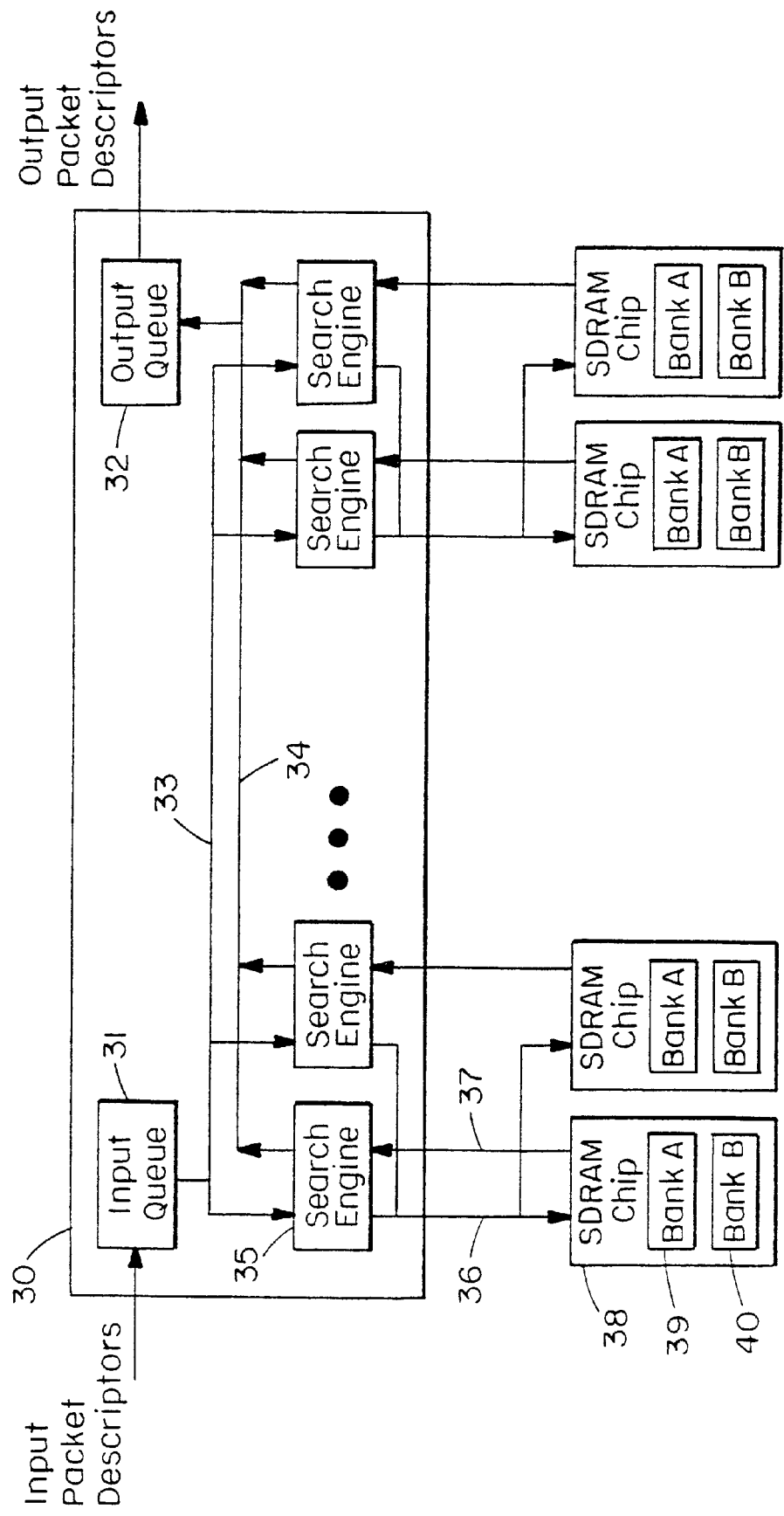
FIG. 7 is a block diagram of a hardware search engine used to implement the prefix search of the present invention.

A block diagram of a hardware search engine is shown in FIG. 7. The search ASIC (30) accepts input packet descriptors, the packet header plus auxiliary information. For each input packet descriptor, the ASIC performs a prefix search to route and classify the packet, appends this information to the packet descriptor and outputs the augmented descriptor. As shown in the figure, the ASIC comprises an input packet descriptor queue (31), an output packet descriptor queue (32), and a plurality of search engines (35). Multiple search engines are required to meet the high packet throughput requirements of backbone routing. A single search engine cannot keep up with this rate.

In the preferred embodiment there are six search engines. However one skilled in the art will understand that any number of search engines can be employed. Packet descriptors arriving at the search ASIC are queued in the input queue (31). When a search engine becomes idle, it is dispatched to handle one of the waiting descriptors over distribution bus (33). When a search is completed, the augmented descriptor is enqueued in the output queue via output bus (34).

Packet descriptors are tagged with their location in the input queue to maintain packet ordering in the prefix search process. When a search engine reads a packet descriptor from the input queue, it records the descriptor's location in the input queue. When the search is complete, the descriptor, appended with search results, is stored in the identical location in the output queue. The output queue is read in order, waiting until each successive location is filled, thus maintaining packet order even though the search processes may finish out of order.

The augmented tree search structure requires large amounts of memory and is too large to be stored on the search ASIC. It must be stored in off-chip memory. In the preferred embodiment, a separate copy of the search structure is stored in a separate synchronous dynamic random access memory (SDRAM) for each search engine. For six search engines there are six SDRAM chips each holding a complete copy of the augmented tree. One skilled in the art will understand that it is also possible to interleave a single copy across the SDRAM chips or to interleave a smaller number of duplicate copies. In the preferred embodiment, each SDRAM is a single 64Mb (4M×16) chip.

To economize on ASIC package pins, the search engines are organized into pairs and each pair of search engines shares a set of address and control pins (except chip selects) (36). This set of pins is in turn connected to the pair of SDRAMs associated with the pair of search engines. As data bandwidth is critical, each search engine and its corresponding SDRAM exchange data over a dedicated 16-bit data bus (37). This bus is used primarily for reading during search operations. However it is also used to write to the SDRAM when initializing the augmented tree structures and when broadcasting updates to the search tree across the SDRAMS.

Each SDRAM chip contains a plurality of memory banks. In the preferred embodiment there are two banks, denoted A (39) and B (40). This banked structure permits data to be read from one bank while the other bank is being precharged or addressed. To optimize bandwidth, the preferred embodiment stores a copy of all internal nodes of the augmented tree in both banks. This permits rapid access during most of the search, the traversal of internal nodes. To optimize storage, the leaf nodes are not duplicated, but rather are interleaved across the two banks.

Figures 8, 9, 10:
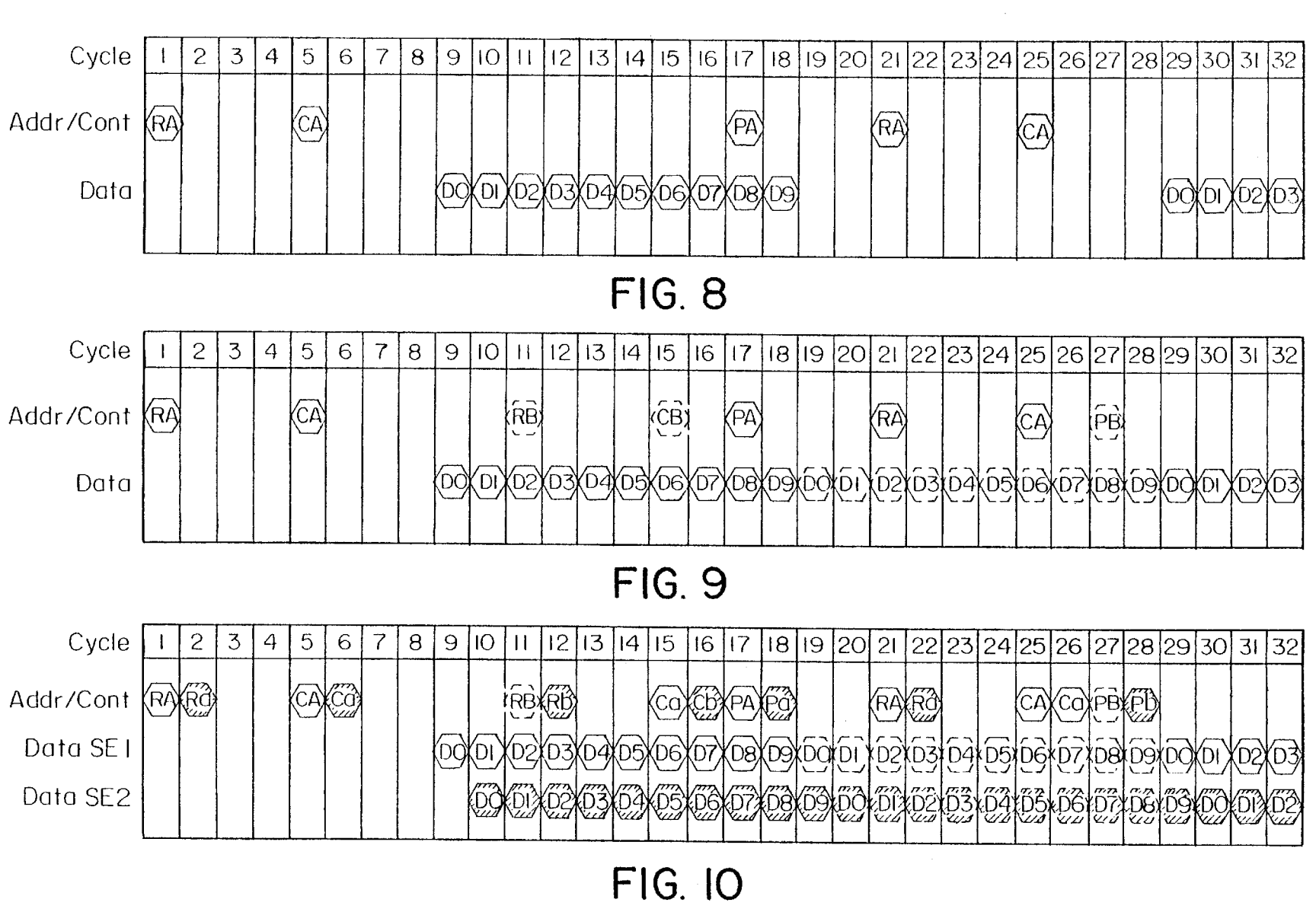

The timing of a typical access to an SDRAM chip is shown in FIG. 8. The figure shows time, in cycles, across the top. The value of the signals on the address/control or data lines, if any, during a particular cycle are shown below. The address of the location being referenced is divided into two parts, the high-order bits form a row address and the low-order bits form a column address. These two components are used in turn to address the row and column of the two-dimensional memory array on the SDRAM chip. As shown in the figure, the search engine presents the row address (RA) to the chip on the address/control lines during cycle 1. The search engine then waits four cycles while the SDRAM fetches the requested row of memory. The column address (CA) is then presented during cycle 5. Another four cycles elapse while the SDRAM extracts this column from the previously fetched row. Starting in cycle 9, the SDRAM sends a burst of 20-bytes of data, two bytes per cycle over the data lines. The first two bytes (D0) are sent in cycle 9, then next two (D1) are sent in cycle 10, and so on. One cycle before the end of the burst, in cycle 17, the search engine sends a request to precharge the selected bank (PA), in this case bank A, to the SDRAM. Four cycles later, the bank is precharged and able to accept another row address in cycle 21.

Transferring two consecutive bursts of data from a single SDRAM bank, as shown in FIG. 8, is rather inefficient because the data lines remain idle while the bank is precharged and addressed. In this example, the data lines have a duty factor of 50% (busy 10 cycles of 20). FIG. 9 shows how a transfer efficiency of 100% can be achieved by alternating accesses to the two banks on the SDRAM chip. The signals shown in italics in the lighter-shaded boxes are directed to bank B. During cycles 11 and 15, while the data from bank A is being transferred, bank B is being addressed. Thus, during cycle 19, after the data burst from bank A is complete, the transfer from bank B begins. By alternating accesses to banks A and B in turn, the data pins are used every cycle maintaining maximum bandwidth.

During most of the augmented tree search, the search engine is accessing internal nodes. Because these nodes are stored in both banks of the SDRAM, the search engine is always able to find the node that it needs to access next while alternating banks. At the end of the search, the search engine accesses a leaf node that is stored in only one bank. At this point, the search engine may idle the SDRAM pins if, for example, the current access is directed to bank A and the required leaf node is stored only in bank A. However, this overhead is not severe because a leaf node is accessed only once during each search.

To avoid idling the memory when a search task must read two blocks of data from the same bank in successive accesses, each search engine in the preferred embodiment operates two instances of the search algorithm (two search tasks). The two tasks normally alternate their accesses to the memory. Thus each task normally is able to examine the data coming back from one node before providing the row address for its next read. Also, if one task must momentarily idle because it must make two successive accesses to the same bank, the other task may be able to use the idle time productively.

The address and control lines are only lightly utilized in the timing diagram of FIG. 9. This low duty factor can be exploited to reduce pin count on the prefix search ASIC by having two search engines share a single set of address and control pins as shown in FIG. 7. The two search engines each communicate with their own SDRAM chip over a common set of address and control lines by multiplexing their row access, column access, and precharge requests on these lines. Dedicated chip select lines (not shown in FIG. 7) are used to indicate the SDRAM to which the request is targeted.

The timing of this multiplexing is shown in FIG. 10. Search engine 1 places its requests on the shared address and control lines during odd cycles (1, 5, 11, . . . ) and search engine 2 places its requests on the control lines during even cycles (2, 6, 12, . . . ). This guarantees that there is never a conflict over access to the lines. The two search engines transfer their data over separate dedicated data buses as shown.

One skilled in the art will understand that alternative SDRAM timing schemes are possible. For example, one can vary the number of cycles between the steps of precharge, row access, column access, and data transfer. Also, one can transfer more or fewer bytes of data during each burst. A designer will optimize the timing and the transfer size for a particular implementation.

Figure 11:
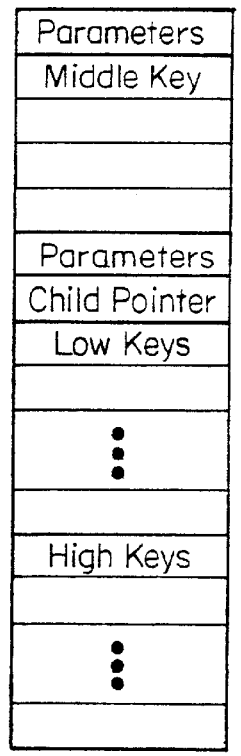
FIG. 11 illustrates the orientation of data within a node to store the middle key before low keys and high to improve performance.

By arranging the storage of nodes in memory so that the middle partitioning key is stored first, as illustrated in FIG. 11, the performance of the search engine can be further enhanced. With the arrangement, the search engine reads the middle key, along with parameters and other overhead information on its first access to the node. Based on a comparison of the search key to the middle key, it then reads either the low keys or the high keys on its second access, but not both. Compared to the conventional approach of reading the entire node from memory on each access, this method results in a significant performance improvement.

The timing of a middle-key-first node read can be understood in conjunction with FIGS. 9 and 11. Each row of FIG. 11 corresponds to two bytes of data, the amount transferred by the search engine in one cycle. The search engine starts reading data from the beginning of the node record in cycle 9 of FIG. 9. In cycle 9 it reads two parameter bytes. These parameters, stored ahead of the middle key, are those required to interpret the middle key, such as the number of bits to strip before comparison and the size of the middle key, and those required to locate the start of the high and low key blocks, such as the type of node, total space for low keys, and the number of low keys. In cycles 10–11, the search engine reads the 4 bytes of the middle key. Other parameter information, such as the size and number of the high keys and the size of each child (for internal nodes) along with the child pointer and result pointer (for leaf nodes) is then read during cycles 12–18. If there is not sufficient parameter and pointer information to fill all of these cycles, the search engine speculatively starts reading low keys. In parallel with reading the parameters and pointers, in cycles 12–14, the search engine compares the search key with the middle key and, depending on the result, calculates the address for either the low keys or the high keys. This calculated address is used to modify the column address for bank B that is output in cycle 15. Based on this address, the search engine then reads just the low keys, or just the high keys from bank B in cycles 21–30.

As described earlier, the preferred embodiment stores a copy of all internal nodes of the augmented tree in both banks A and B, while leaf nodes are stored only once to conserve memory space. Also, the preferred embodiment alternates reading nodes for two instances of the search algorithm. By the latter property, the search engine would know in advance that it will read a leaf node from bank B upon finishing the current internal node. In that case, the sequence in FIG. 9 can be adjusted to eliminate idle SDRAM data cycles due to successive accesses to bank B. The second row address, RB in cycle 11, is suppressed, as is the first precharge, PA in cycle 17. The second column address, CB in cycle 15, is directed to bank A instead, as is the second precharge, PB in cycle 27. Thus an internal node can be processed using either one SDRAM bank or two, and the search engine can prepare either SDRAM bank to read the following leaf node without any idle cycles.

Optimizing the structure of the node and the search tree to match the latency and burst-access size of the memory can be generalized. For example, one could divide the low keys into two parts and store the middle low key first. These parts could in turn be subdivided and so on. Also, the choice of the overall size of each node, which trades off the depth of the tree, and hence the number of accesses required, against the size of each node, and hence the amount of data transferred on each access, can be optimized to match the timing characteristics of the memory device. With different memory timing the node size and organization may be optimized differently than presented here for the preferred embodiment.

One skilled in the art will understand that the size of an augmented tree node should be set to a size determined by the timing parameters of the tree memory to optimize DRAM bandwidth and hence search time. Two parameters, $t_1$ and $t_2$ characterize the memory timing. The first parameter, $t_1$, is the time required to access the first word of a node from the first address cycle, 8 cycles in FIGS. 8–10. The second parameter, $t_2$, is the time to reference each subsequent word, 1 cycle in FIGS. 8–10. Given these parameters, the time to reference N words can be calculated as $t(N)=t_1+(N-1)t_2$.

As the node size, N, gets larger, the time to access each node increases according to the formula above. This increased access time is offset, however, because the number of nodes that must be accessed to complete the search decreases with node size. This number is given by $d(N,M)=\log(M)/\log(N)$ where M is the size of the tree. The total search time is the product of these two formula $T(N)=\log(M)(t_1+(N-1)t_2)/\log(N)$. We can ignore the log(M) term as it is independent of node size and focus on the remaining component of search time, $T1(N)=(t_1+(N-1)t_2)/\log(N)$. By solving this equation for the value of N that gives a minimum T1(N), we can optimize the node size for a given set of memory timing parameters.

Figure 14:
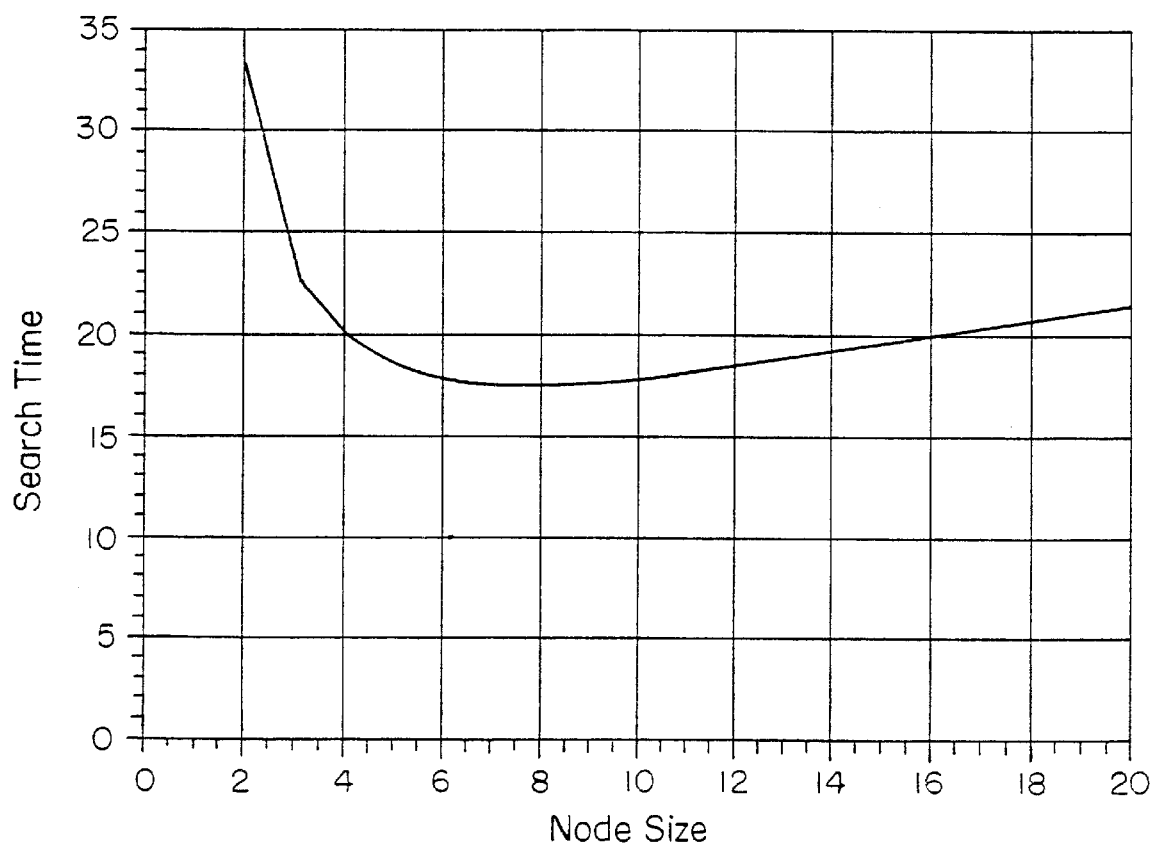
FIG. 14 is a graph of search time as a function of node size.

For example, the graph of FIG. 14 shows how search time, T1, varies as the node size is varied from 2 to 20 keys with the DRANM timings shown in FIG. 8–10. The figure shows that the optimum node size for these timing parameters is 8 words. The figure also shows that there is a step penalty for smaller node sizes but a more gradual penalty for using node sizes that are larger than optimal.

Alternative Data Structure

Figure 12:
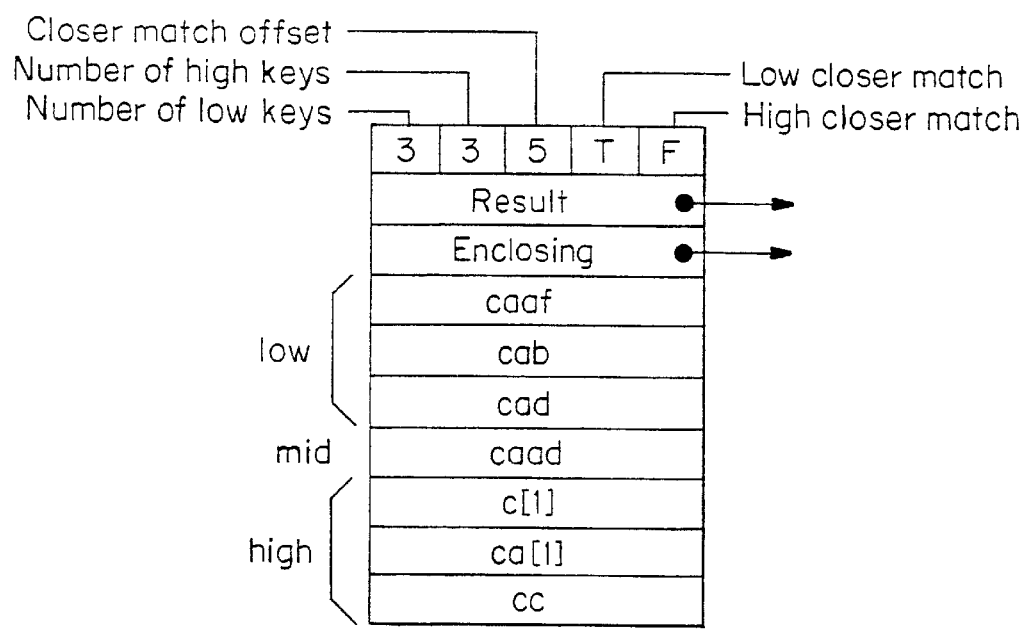
FIG. 12 illustrates a leaf node in an alternative embodiment.
Figure 13:
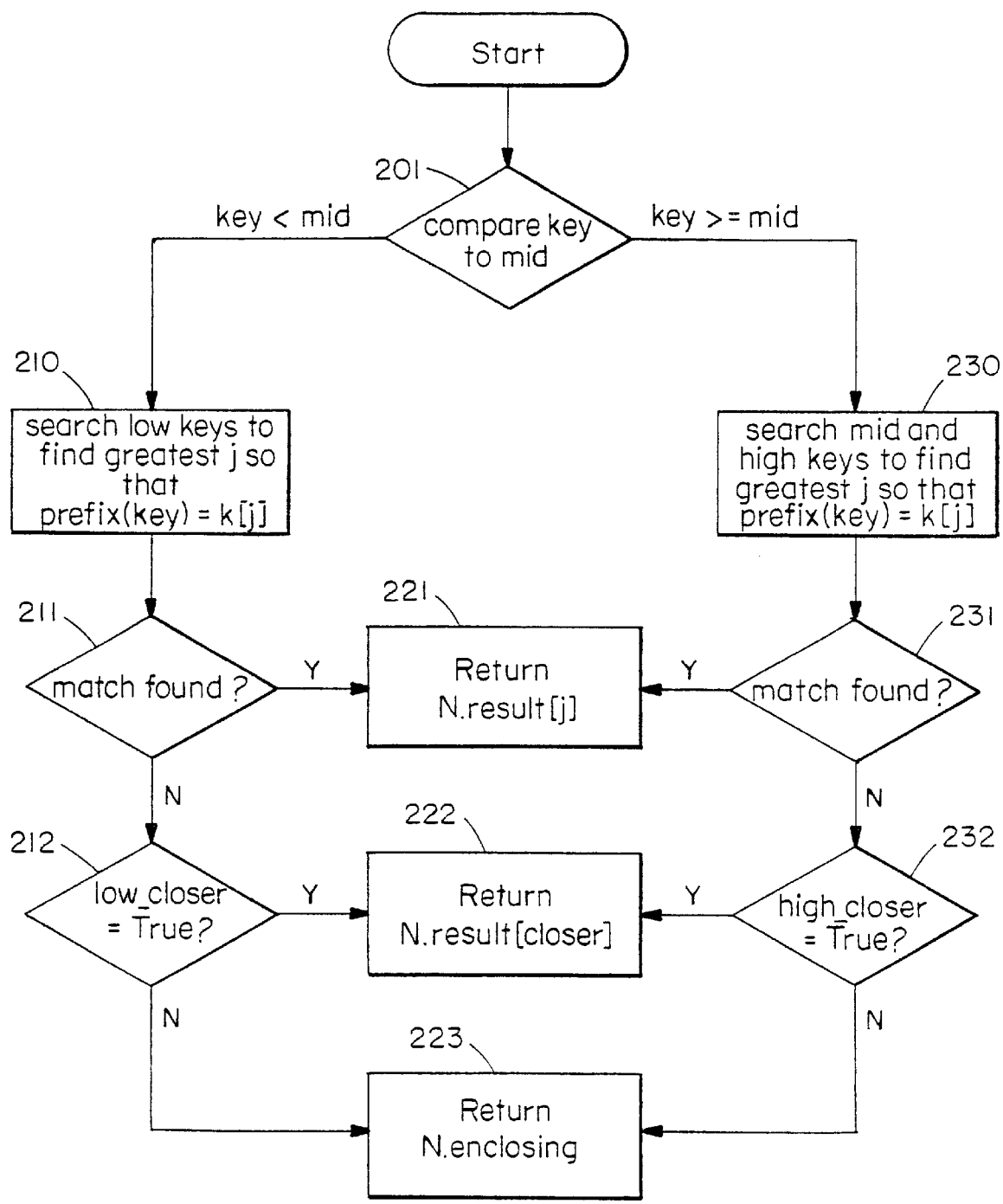
FIG. 13 is a flow chart for processing a leaf node as illustrated in FIG. 12.

In an alternate embodiment of the invention, the leaf node is organized as shown in FIG. 12 and searched using the algorithm shown in the flowchart of FIG. 13. The modifications of this embodiment allow the longest matching prefix to be determined during the single forward scan to a point within the node where the search key is greater than or equal to the prefix key stored in the node; that is, the backwards scan of FIG. 5 is not required. Further, this embodiment only requires scan of either the high or low keys within a node.

Processing with only a forward scan is obtained by ordering the closing prefixes within a high or low set without considering the trailing 1. The node within which a closing prefix resides and the high or low set of prefixes in which it resides remain determined by order with the trailing 1 considered; it is only the order within the high or low set which changes. As a result, within a high or low set of prefixes, a matching closing prefix will be noted in forward scan before locating any longer matching prefix. Any closing prefix will be reached from within the closing parenthesis, so the closing prefix can point directly to the result for that prefix.

With only one of the high and low sets of prefixes searched, the system must account for the possibility that a search prefix, which falls within the range of low prefixes, does not match any of those low prefixes but is within a parenthetical having its closing prefix in the high set. On the other hand, a search prefix within the range of the high prefixes, but not matching any of those prefixes, may be within a parenthetical having an opening prefix in the low set. In either case, the enclosing prefix defined by the enclosing pointer would not be the closest matching enclosing prefix. In this embodiment, the leaf node is augmented with three fields that facilitate finding the closest matching prefix without scanning all of the prefixes in a node. The binary field, "high closer match," if true indicates that the node contains a longer (hence closer) enclosing prefix for the high keys in the node than the prefix corresponding to the enclosing result pointer. The "low closer match" field performs an identical function for the low keys. If one of these two binary fields is true, the location of the closer matching prefix is encoded in the "closer match offset" field as an offset from the first key in the node.

At most one of these two fields may be true in any given leaf node. If the low is true, there must be a closing parenthetical in the high set for which no opening parenthetical is found in the low set; and if the high is true, there must be an opening parenthetical in the low set for which the closing parenthetical is outside the node. Both cases being true would violate the requirement that parentheticals be nested.

Specifically, enclosing keys are handled differently in the embodiment of FIG. 12 than in the embodiment of FIGS. 4a and 4b:

1. The result pointer associated with a closing parenthesis prefix, one ending in 1 in the figure, points to the result for that prefix, not for an enclosing prefix as in FIGS. 3, 4a and 4b. For example, the result for cal is the result for the prefix ca, not the result for the prefix c.
2. Within a list of high keys or a list of low keys enclosing prefixes are ordered by their prefix without considering the trailing 1 or 0. (The 1s in FIG. 12 are enclosed in brackets to indicate that they are not used in ordering the keys in the list). If both parentheses are in one such list, they would be adjacent in the ordering and one may be discarded as redundant.

The flow chart of FIG. 13 shows the algorithm for searching a leaf node augmented with closest match information as in FIG. 12. The flow chart is best understood by means of an example. Consider, for instance, searching the leaf node of FIG. 12 for the key "cac." The procedure starts at box 201 where the key, "cac," is compared to mid, the middle key stored in the node, "cadd." As "cac" is lexicographically less than "cadd" the search proceeds to box 210 to search the low keys. In box 210 the low keys are searched to find the last low key, k[j], that is a prefix of the search key. In performing this search, the trailing 1 or 0 of an enclosing prefix is ignored. Because the keys are sorted in lexicographical order ignoring the trailing 1s and 0s, the last key that matches a prefix of the search key is the longest matching prefix. The results of this search are checked in box 211 to see if a matching prefix was found. If a prefix is found, it is the longest matching prefix, and the result associated with this prefix is returned in box 212. If no matching prefix was found in box 210, which is the case when the key is "cac," the search proceeds to box 212.

Box 212 uses the new fields of the leaf node to check for a closer match elsewhere in the node without the need to scan the rest of the node. The box checks the value of the "low closer match" field in the augmented leaf node. If this field is false there is no closer match within the node so the search proceeds to box 223 to return the result associated with the enclosing pointer. If this field is true, then there is a closer match in the node and the search proceeds to box 222 where the result associated with this match is returned. In our example, where we are searching for a prefix of the key "cac" in the leaf node of FIG. 12, the "low closer match" field is true so the search proceeds to box 222. In this box, the value of the "closer match offset" field, 5 (abbreviated "closer" in FIG. 13) is used to find the closest matching prefix at an offset of 5 keys after the first key in the node. This corresponds to the closing parenthesis of the prefix, "ca," stored in the sixth position, so the result associated with "ca" is returned. This closing prefix must be a prefix for all unmatched prefixes within the low set of prefixes because closing prefixes are by definition matching prefixes of all prefixes between the opening and closing parentheticals, and if any prefix were outside the parentheticals in the low set, the opening parenthetical would have been encountered and returned a result.

Figure 15:
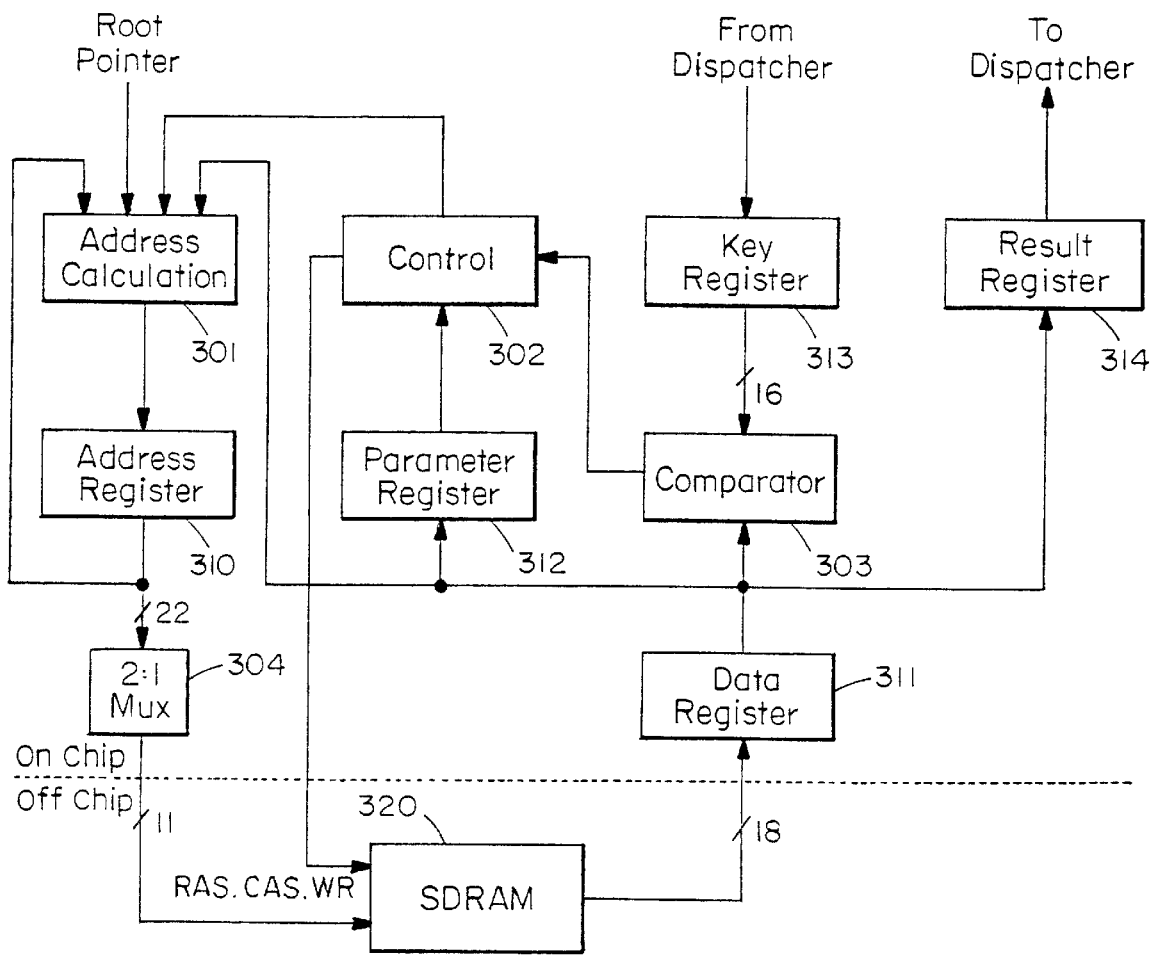
FIG. 15 is a block diagram of a search engine for processing a search algorithm including the process of FIG. 13 in the system of FIG. 7.

FIG. 15 shows a block diagram of a search engine for executing the alternate search algorithm of FIG. 5 with FIG. 13 substituted for the leaf node processing. The engine consists of a set of registers, 310–314, to hold the state of the search, a comparator 303, control logic 302, address calculation logic 301, and an address multiplexer 304. The search is initiated by loading the address register with the address of the root node of the augmented tree and loading the key register with the search key. The control logic then presents the root address to the SDRAM and starts an access sequence to read a burst of data as illustrated in the timing diagram of FIG. 8. When the data returns from the off-chip SDRAM, it is clocked into a data register. From this register the data is routed to the appropriate location depending on its type. The parameter fields at the start of the node are latched into the parameter register where they are used by the control logic to direct the search. Stored key fields are routed to the comparator where they are compared against the search key 16-bits at a time. Note that while the key register is large enough to accommodate the longest possible search key, it is accessed 16-bits at a time to facilitate comparison with the 16-bit wide data stream returning from the SDRAM. Finally, when the search is complete, the result data is routed to the result register from which it is placed in the output FIFO.

When key fields of an internal or leaf node are being read from the SDRAM, the comparator performs a masked compare to compare just the bits of the stored prefix key to the search key. Masking is required because the variable length prefixes within the node may not be aligned to a 16-bit boundary and thus only part of the 16-bit word read from memory may contain the stored prefix. The remaining bits must be masked from the comparison. The results of the comparison are passed to the control logic to direct the search.

During the traversal of internal nodes, the comparison result determines the index of the child node, j in FIG. 5, that is to be visited next. This information is passed from the control logic to the address calculation logic where it is used to compute the address of the next node to visit according to the equation in Box 104 of FIG. 5. The address calculation logic consists of an adder, some multiplexers, and a lookup table to compute the value of r, the DRAM page roundoff factor.

When the search reaches a leaf node, the control logic carries out the algorithm of FIG. 13. As with an internal node, the parameters including the enclosing result and first result pointers, are first loaded into the parameter register. Next, as the middle key is read, it is compared (16 bits at a time) to the search key. The result of this comparison, along with the parameter values is used in an address calculation to determine whether to read the high or low keys and where to find them in the SDRAM. Finally, the scan of the high or low keys determines a prefix index, j, and an indication of whether a matching prefix was found. If the prefix was found, the address calculation logic computes the address for the result according to box 221 of FIG. 13. Otherwise the address calculation logic returns the closer result within the node (box 222 of FIG. 13) or the enclosing result pointer (box 223 of FIG. 13). This result address, whatever its source, is used to read the final result from the SDRAM. This result is passed to the result register. One skilled in the art will understand that depending on the circumstances the result may be returned in different forms. In some cases the result itself may be returned. In other cases just the pointer to the result (from the address register) is returned, and in still other cases a portion of the result and a pointer to the remainder of the result are returned.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. Prefix search circuitry comprising, in an integrated circuit, a plurality of prefix search engines, each performing a prefix search of a prefix search tree data structure based on a prefix search key, each prefix search engine comprising:
   a comparator that compares a search key with data from the prefix search tree data structure; and
   an address calculator which calculates, in a forward pass of the tree data structure toward a leaf, memory addresses of nodes of the tree data structure based on the comparator output to read data of the prefix search data structure from memory.

2. Prefix search circuitry as claimed in claim 1 further comprising, in the integrated circuit:
   an input queue for receiving input packet descriptors;
   an output queue; and
   a network for distributing prefix search keys from the input packet descriptors to the plurality of prefix search engines as the engines become idle and for forwarding the results of prefix searches of the plural prefix search engines to the output queue in an order independent of the order in the input queue.

3. Prefix search circuitry as claimed in claim 2 wherein the results of the prefix searches are ordered in the output queue in the same order that the corresponding input packet descriptors arrived at the input queue.

4. Prefix search circuitry as claimed in claim 2 wherein the network comprises a bus.

5. Prefix search circuitry as claimed in claim 1 further comprising an array of memory units, each unit dedicated to a search engine within the integrated circuit.

6. Prefix search circuitry as claimed in claim 5 wherein each search engine reads data in bursts over integrated circuit data pins dedicated to the search engine and each search engine addresses a memory unit over integrated circuit pins shared with another search engine.

7. Prefix search circuitry as claimed in claim 6 wherein each memory unit is a synchronous dynamic random access memory (SDRAM).

8. Prefix search circuitry as claimed in claim 6 wherein each memory unit comprises plural banks of memory cells and a prefix search tree data structure is stored across the plural banks to provide access to the tree structure in successive read cycles.

9. Prefix search circuitry as claimed in claim 1 further comprising an array of memory units, each having plural banks of memory cells, and a prefix search tree data structure stored across the plural banks to provide access to the tree structure in successive read cycles.

10. Prefix search circuitry as claimed in claim 9 wherein duplicate copies of internal nodes of the tree structure are stored in each of plural banks.

11. Prefix search circuitry as claimed in claim 10 wherein leaf nodes are interleaved across plural banks.

12. Prefix search circuitry as claimed in claim 1 wherein each prefix search engine comprises a data register which receives data of the tree structure from memory and a search key register, the comparator comparing a search key in the search key register with data from the data register.

13. Prefix search circuitry as claimed in claim 1 wherein the address calculator selects the address of the next tree node based on the comparator output.

14. Prefix search circuitry as claimed in claim 13 wherein the address calculator selects an address as a result of a comparison of plural stored keys with the search key.

15. A prefix search engine comprising:
   a data register which receives data of a tree structure from memory;
   a search key register;
   a comparator which compares a search key in the search key register with data from the data register; and
   an address calculator which calculates, in a forward pass of the tree data structure toward a leaf, memory addresses of nodes of the tree data structure based on the comparator output to read the data from memory into the data register.

16. A prefix search engine as claimed in claim 15 wherein the address calculator selects the address of the next tree node based on the comparator output.

17. A prefix search engine as claimed in claim 16 wherein the address calculator selects an address as a result of a comparison of plural stored keys with the search key.

* * * * *